US010099515B2

(12) United States Patent
Nakamura

(10) Patent No.: US 10,099,515 B2
(45) Date of Patent: Oct. 16, 2018

(54) PNEUMATIC RADIAL TIRE

(71) Applicant: TOYO TIRE & RUBBER CO., LTD., Osaka-shi, Osaka (JP)

(72) Inventor: Yuichi Nakamura, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 833 days.

(21) Appl. No.: 14/452,230

(22) Filed: Aug. 5, 2014

(65) Prior Publication Data
US 2015/0101729 A1    Apr. 16, 2015

(30) Foreign Application Priority Data

Oct. 16, 2013    (JP) .................................. 2013-215376

(51) Int. Cl.
*B60C 15/00* (2006.01)
*B60C 9/08* (2006.01)

(52) U.S. Cl.
CPC ............ *B60C 15/0018* (2013.01); *B60C 9/08* (2013.01); *B60C 15/0009* (2013.01); *B60C 15/0027* (2013.01); *B60C 2015/009* (2013.01)

(58) Field of Classification Search
CPC ............ B60C 15/0018; B60C 15/0009; B60C 15/0027; B60C 2015/009; B60C 9/08; B60C 9/12
USPC ................................................. 152/550, 552
See application file for complete search history.

(56) References Cited

U.S. PATENT DOCUMENTS 5,759,315 A    6/1998    Suzuki et al.
2009/0188601 A1    7/2009    Kuniyasu

FOREIGN PATENT DOCUMENTS

| JP | 58110305 A | * | 6/1983 | ............... B60C 9/09 |
| JP | S58110305 A | | 6/1983 | |
| JP | 08-132818 A | | 5/1996 | |
| JP | 2007-302018 A | | 11/2007 | |

OTHER PUBLICATIONS

Machine translation of JP58-110305 (no date).*
Office Action dated Oct. 24, 2016, issued in counterpart Chinese Patent Application No. 201410371273.7, with English translation. (13 pages).

(Continued)

*Primary Examiner* — Justin R Fischer
*Assistant Examiner* — Philip N Schwartz
(74) *Attorney, Agent, or Firm* — Westerman, Hattori, Daniels & Adrian, LLP

(57) ABSTRACT

The invention provides a pneumatic radial tire which improves durability by lowering breakdowns in both of a ply end and a wind-up portion without an increase of weight and manufacturing cost. The pneumatic radial tire has a carcass layer which is provided between a pair of bead portions and is locked in a state in which end portions are wound up to the bead cores. The carcass layer is constituted by a first ply, a second ply and a third ply which are laminated one by one from an inner side to an outer side in a tire radial direction in a tire equator. The first ply and the third ply are wound up to the bead cores. The second ply terminates in a state in which the second ply is interposed between the first ply and the third ply, without reaching the bead cores.

5 Claims, 4 Drawing Sheets

(56) References Cited

OTHER PUBLICATIONS

Notification of Decision of Rejection dated May 4, 2017, issued in Chinese Patent Application No. 201410371273.7, with English translation.
Office Action dated Mar. 10, 2017, issued in Japanese Patent Allication No. 2013-215376, with English translation.

\* cited by examiner

PNEUMATIC RADIAL TIRE

BACKGROUND OF THE INVENTION

Field of the Invention

The present invention relates to a pneumatic radial tire in which high durability is required.

Description of the Related Art

In a pneumatic radial tire installed to a pickup truck which is popular in U.S.A., improvement of durability is required for a severe condition such as an off-road traveling and a bad road traveling, a high internal pressure and a high load.

Patent Documents 1 and 2 can be listed up as documents showing an example of a structure of a radial tire. The tires described in Patent Documents 1 and 2 have a pair of bead portions, and a carcass layer which is provided between a pair of bead portions and is locked in a state in which end portions are wound up to bead cores of the bead portions. The carcass layer is constituted by two carcass plies.

PRIOR ART DOCUMENT

Patent Document

Patent Document 1: Japanese Unexamined Patent Publication No. JP-A-8-132818
Patent Document 2: Japanese Unexamined Patent Publication No. JP-A-2007-302018

SUMMARY OF THE INVENTION

A breakdown tends to be generated in the wind-up portion of the carcass ply to the bead core because of a tensile force acting on the carcass ply. In order to suppress the breakdown in the wind-up portion so as to improve durability, it is thought that the carcass layer which can be deemed to be a framework of the tire is constituted by three carcass plies.

However, in the structure in which three carcass plies are wound up to the bead core, ply ends of three carcass plies are arranged in an area outside the bead core, that is, an area in which a great strain tends to be generated. Therefore, a breakdown in the ply ends is caused. Further, since three carcass plies are wound up to the bead core, the bead portion becomes thicker and a weight thereof is increased. Further, in order to wind up three carcass plies corresponding to the framework to the bead core, air retention tends to be caused since three carcass plies have a higher rigidity than the case of two carcass plies and are hard to be bent. As a result, it is hard to manufacture and a manufacturing cost is increased.

On the other hand, as shown in FIGS. 4A and 4B, in a structure in which two carcass plies are wound up among three carcass plies, and the remaining one carcass ply is terminated at a position where the carcass ply does not reach the bead core without being wound up, a separation of the ply end is caused by a strain which is a smaller strain in an outer area of the bead core and is generated in the ply end.

The description is given here by exemplifying the tire which is installed to the pickup truck, however, same applied to a tire in which the high durability is required.

The present invention is made by paying attention to the problem mentioned above, and an object of the present invention is to provide a pneumatic radial tire which improves durability by lowering a breakdown in both of a ply end and a wind-up portion without accompanying increase of weight and manufacturing cost.

The present invention employs the following means for achieving the object.

In other words, according to the present invention, there is provided a pneumatic radial tire including a pair of bead portions which have bead cores; and a carcass layer which is provided between the pair of bead portions and is locked in a state in which end portions are wound up to the bead cores, wherein the carcass layer is constituted by a first ply, a second ply and a third ply which are laminated one by one from an inner side to an outer side in a tire radial direction in a tire equator, wherein the first ply and the third ply are wound up to the bead cores, and wherein the second ply terminates in a state in which the second ply is interposed between the first ply and the third ply, without reaching the bead cores.

As mentioned above, since the second ply does not reach the bead core, and is not wound up to the bead core, it is possible to suppress the breakdown of the ply end in the outer area of the bead core, and it is possible to reduce the thickness and the weight of the bead portion. Further, it is possible to suppress the increase of the manufacturing cost. Further, since the second ply terminates in the state in which the second ply is interposed between the first ply and the third ply, it is possible to prevent the separation of the ply end of the second ply. Further, the second ply can bear the tensile force acting on the first ply and the third ply, and it is possible to suppress the breakdown of the wind-up portion.

In order to accurately suppress the breakdown of the wind-up portion, it is preferable that the terminating position of the second ply is arranged in a range which is equal to or more than 0% and equal to or less than 30% of a tire cross sectional height from an upper surface of the bead core to an outer side in the tire radial direction.

In order to achieve both of the improvement of durability and the easiness of manufacturing, it is preferable that the terminating position of the second ply is arranged in a range which is equal to or more than 5% and equal to or less than 15% of a tire cross sectional height from an upper surface of the bead core to an outer side in the tire radial direction.

DETAILED DESCRIPTION OF THE PREFERRED EMBODIMENTS

A description will be given below of a pneumatic radial tire according to an embodiment of the present invention with reference to the accompanying drawings.

Figure 1:
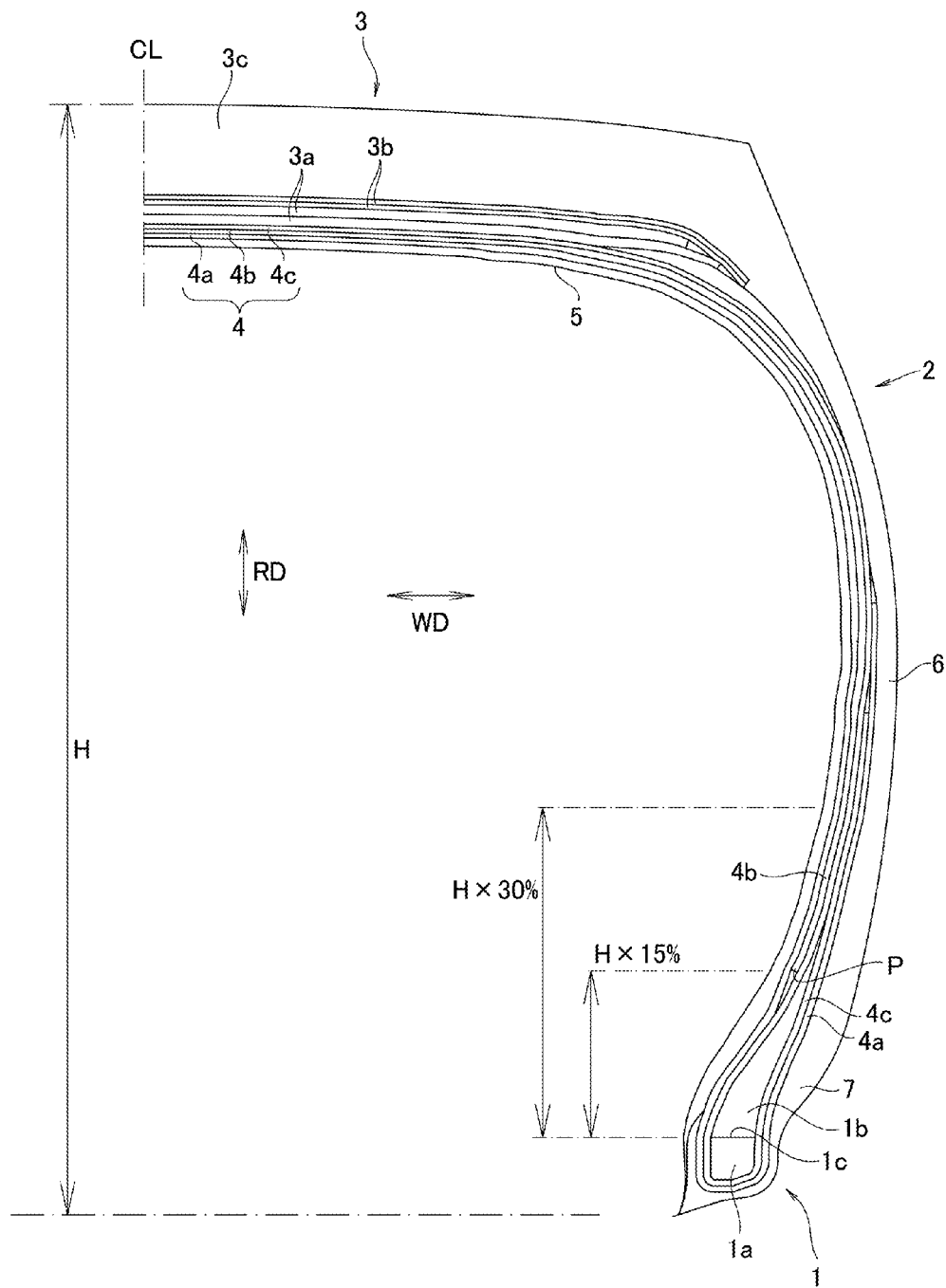
FIG. 1 is a tire meridian half cross sectional view showing an example of a tire according to the present invention.

As shown in FIG. 1, a pneumatic radial tire is provided with a pair of bead portions 1, side wall portions 2 which extend to outer sides in a tire radial direction RD from the respective bead portions 1, and a tread portion 3 which is connected to outside ends in the tire radial direction RD from both the side wall portions 2. An annular bead core 1a and a bead filler 1b are arranged in the bead portion 1, the annular bead core 1a covering a convergence body such as a steel wire by a rubber, and the bead filler 1b being made of a hard rubber.

Further, the tire is provided with a toroidal carcass layer 4 which runs into the bead portions 1 from the tread portion 3 via the side wall portions 2. The carcass layer 4 is provided between a pair of bead portions 1, is constructed by at least one carcass ply, and is locked in a state in which its end portions are rolled up via the bead cores 1a. The carcass ply is formed by coating with a topping rubber a cord which extends approximately vertically to a tire equator CL. An inner liner rubber 5 for retaining a pneumatic pressure is arranged in an inner side of the carcass layer 4.

Further, side wall rubbers 6 are provided in outer sides of the carcass layer 4 in the side wall portions 2. Further, rim strip rubbers 7 coming into contact with a rim (not shown) at a time of being installed to the rim are provided in the outer sides of the carcass layer 4 in the bead portions 1.

An outer side of the carcass layer 4 in the tread portion 3 is provided with a belt 3a for reinforcing the carcass layer 4, a bet reinforcing member 3b and a tread rubber 3c in this order from an inner side toward an outer side. The belt 3a is constructed by a plurality of belt plies. The belt reinforcing member 3b is constructed by coating a cord extending in a tire peripheral direction with a topping rubber. The belt reinforcing member 3b may be omitted as occasion demands.

In the above, the ground surface is a surface which is grounded onto a road surface when the tire is vertically put on a flat road surface in a state in which the tire is assembled in a normal rim, and a normal internal pressure is filled, and a normal load is applied to the tire, and an outermost position in the tire width direction WD comes to a ground end E. The normal load and the normal internal pressure indicate a maximum load (a design normal load in the case of a tire for a passenger car) which is defined in JIS D4202 (specification of an automotive tire) and a corresponding pneumatic pressure, and the normal rim indicates a standard rim which is defined in JISD4202 in principle.

The carcass layer 4 is constituted by a first ply 4a, a second ply 4b and a third ply 4c which are laminated, in a tire equator CL, one by one from an inner side to an outer side in the tire radial direction RD. The first ply 4a and the third ply 4c are wound up to the bead core 1a, and terminate in an area outside the bead core 1a. The second ply 4b terminates in a state in which the second ply 4b is interposed between the first ply 4a and the third ply 4c without reaching the bead core 1a. The second ply 4b terminates in an area inside the bead core 1a.

A terminating position P of the second ply 4b may be arranged in a range which is equal to or more than 0% and equal to or less than 30% of a tire cross sectional height H from the upper surface 1c of the bead core 1a toward an outer side in the tire radial direction RD. For example, in the example shown in FIG. 1, the terminating position P of the second ply 4b is arranged at a position which is 15% of the tire cross sectional height H from the upper surface 1c of the bead core 1a toward the outer side in the tire radial direction RD. In an example shown in FIG. 2, the terminating position P is arranged at a position which is 5% of the tire cross sectional height H. In an example shown in FIG. 3, the terminating position P is arranged at a position which is 30% of the tire cross sectional height H.

As mentioned above, the pneumatic radial tire according to the present embodiment has a pair of bead portions 1 which have bead cores 1a; and a carcass layer 4 which is provided between the pair of bead portions 1 and is locked in a state in which end portions are wound up to the bead cores 1a, wherein the carcass layer 4 is constituted by a first ply 4a, a second ply 4b and a third ply 4c which are laminated one by one from an inner side to an outer side in a tire radial direction RD in a tire equator CL, wherein the first ply 4a and the third ply 4c are wound up to the bead cores 1a, and wherein the second ply 4b terminates in a state in which the second ply 4b is interposed between the first ply 4a and the third ply 4c, without reaching the bead cores 1a.

As mentioned above, since the second ply 4b does not reach the bead core 1a, and is not wound up to the bead core 1a, it is possible to suppress the breakdown of the ply end in the outer area of the bead core 1a, and it is possible to reduce the thickness and the weight of the bead portion 1. Further, it is possible to suppress the increase of the manufacturing cost. Further, since the second ply 4b terminates in the state in which the second ply 4b is interposed between the first ply 4a and the third ply 4c, it is possible to prevent the separation of the ply end of the second ply 4b. Further, the second ply 4b can bear the tensile force acting on the first ply 4a and the third ply 4c, and it is possible to suppress the breakdown of the wind-up portion.

According to the present embodiment, the terminating position (P) of the second ply 4b is arranged in a range which is equal to or more than 0% and equal to or less than 30% of a tire cross sectional height (H) from an upper surface 1c of the bead core 1a to an outer side in the tire radial direction (RD).

As mentioned above, since the terminating position (P) of the second ply 4b exists in the position which is appropriately near the bead core 1a without being wound up to the bead core 1a, the tensile force acting on the first ply 4a and the third ply 4c can be dispersed into the second ply, and it is possible to accurately suppress the breakdown of the wind-up portion.

According to the present embodiment, the terminating position (P) of the second ply 4b is arranged in a range which is equal to or more than 5% and equal to or less than 15% of a tire cross sectional height (H) from an upper surface 1c of the bead core 1a to an outer side in the tire radial direction (RD).

In the case that the terminating position P is disposed in the range of equal to or less than 15%, it is possible to accurately achieve an effect of improving the durability of the wind-up portion in which the second ply 4b bears the tensile force. Further, if the terminating position P is too close to the bead core 1a, it is hard to manufacture. If the terminating position P is disposed in the range of equal to or more than 5%, it is easy to manufacture. As a result, it is possible to achieve both of the improvement of durability and the easiness of manufacturing.

EXAMPLES

In order to specifically show the structure and the effect of the present invention, the following evaluation were made about the following examples.

(1) Bead Durability

Evaluation was made by setting a test tire (tire size LT285/70R17 121) to pneumatic pressure 550 kPa, load 14.2 kN, used rim 17×8.5 J and speed 65 km/h, increasing the load every fixed time and measuring a traveling distance until the test tire got out of order.

(2) Separation Property

Evaluation was made by describing mark "x" in the case that any separation was generated in the ply end and describing mark "○" in the case that any separation was not generated, when traveling at 10,000 km under the same condition as mentioned above.

Example 1

Figure 2:
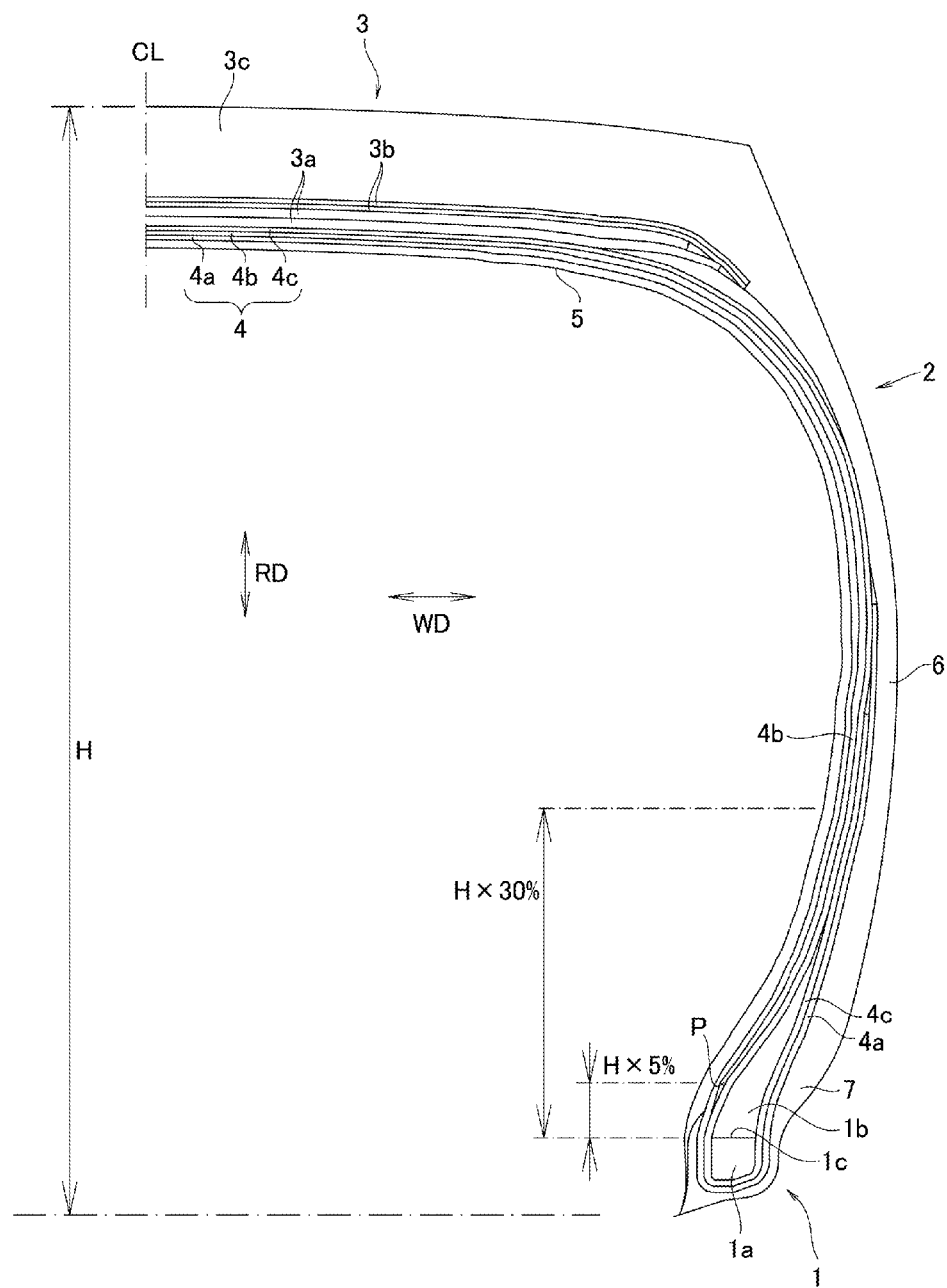
FIG. 2 is a tire meridian half cross sectional view showing another example of the tire according to the present invention.

As shown in FIG. 2, the first ply 4a and the third ply 4c are wound up to the bead core 1a, and the second ply 4b terminates in the state in which the second ply 4b is interposed between the first ply 4a and the third ply 4c, at the position where the second ply 4b does not reach the bead core 1a. The terminating position P of the second ply 4b is arranged at the position which is 5% of the tire cross sectional height H from the upper surface 1c of the bead core 1a toward the outer side in the tire radial direction RD.

Example 2

As shown in FIG. 1, the terminating position P of the second ply 4b is arranged at the position which is 15% of the tire cross sectional height H from the upper surface 1c of the bead core 1a toward the outer side in the tire radial direction RD. The other structures were set to the same as those of Example 1.

Example 3

Figure 3:
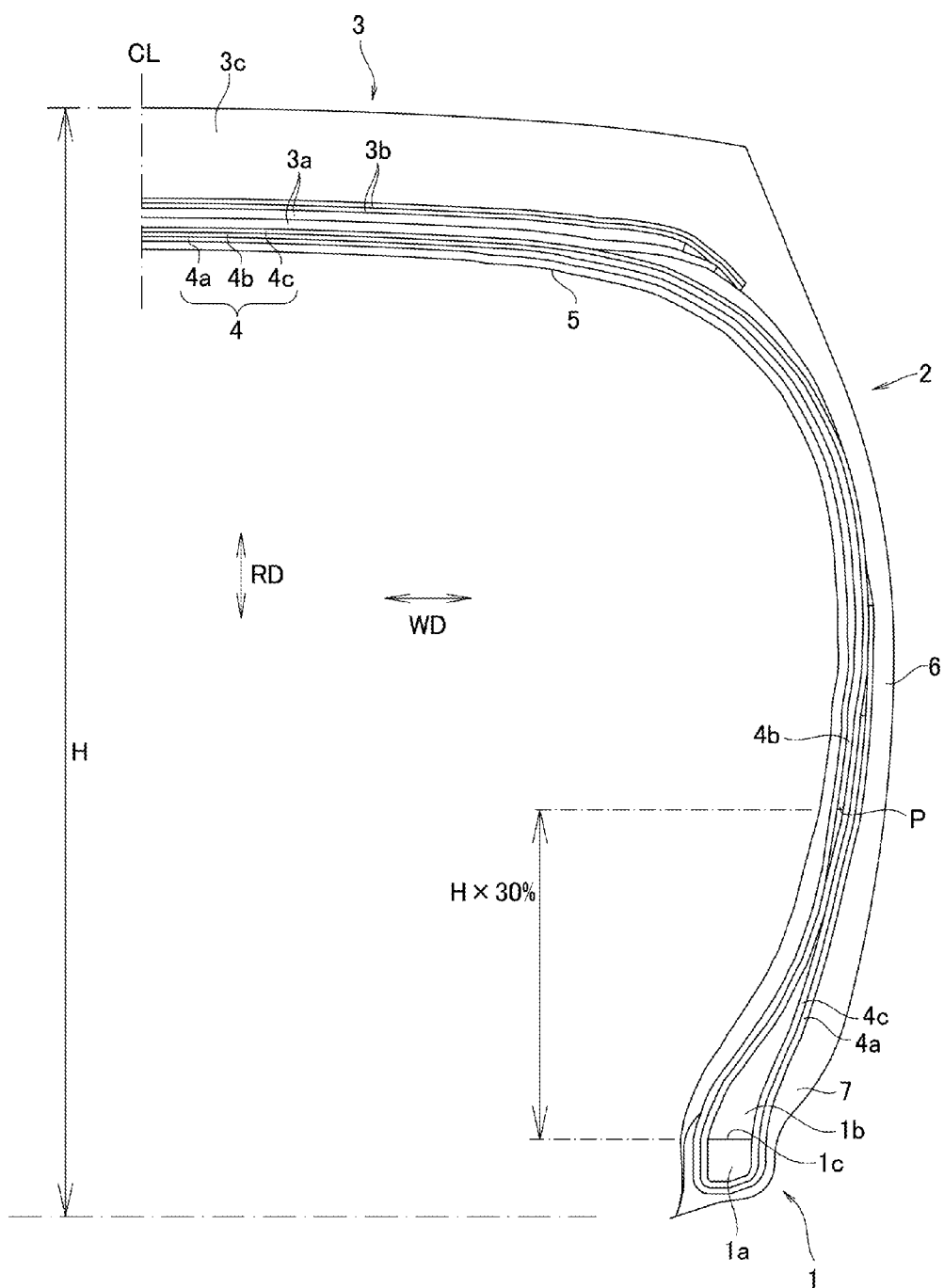
FIG. 3 is a tire meridian half cross sectional view showing an example other than the above of the tire according to the present invention.

As shown in FIG. 3, the terminating position P of the second ply 4b is arranged at the position which is 30% of the tire cross sectional height H from the upper surface 1c of the bead core 1a toward the outer side in the tire radial direction RD. The other structures were set to the same as those of Example 1.

Comparative Example 1

Figure 4A:
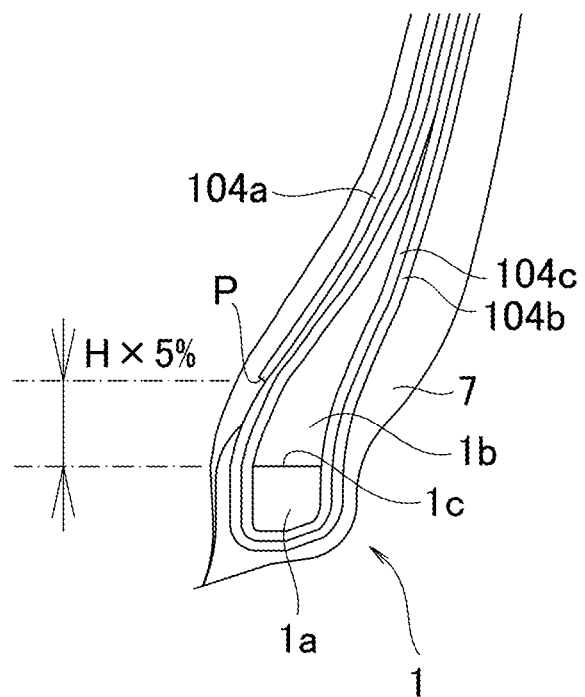
FIG. 4A is a view showing a comparative example.

As shown in FIG. 4A, a second ply 104b and a third ply 104c are wound up to a bead core 1a and are locked to the bead core 1a. A first ply 104a terminates at a position which does not reach the bead core 1a. A terminating position P of the first ply 104a is arranged at a position which is 5% of a tire cross sectional height H from an upper surface 1c of the bead core 1a toward an outer side in a tire radial direction RD. The other structures were set to the same as those of Example 1.

Comparative Example 2

Figure 4B:
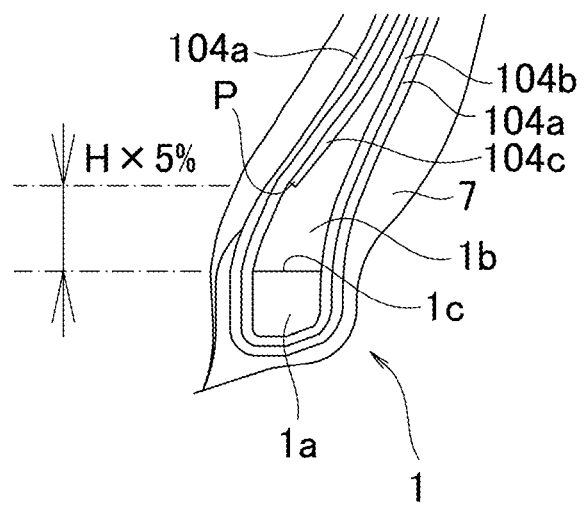
FIG. 4B is a view showing a comparative example.

As shown in FIG. 4B, the first ply 104a and the second ply 104b are wound up to the bead core 1a and are locked to the bead core 1a. The third ply 104c terminates at a position which does not reach the bead core 1a. A terminating position P of the third ply 104c is arranged at a position which is 5% of the tire cross sectional height H from the upper surface 1c of the bead core 1a toward the outer side in the tire radial direction RD. The other structures were set to the same as those of Example 1.

Comparative Example 3

In the tire shown in FIG. 4A, the terminating position P of the first ply 104a was set to a position which is 30% of the tire cross sectional height H from the upper surface 1c of the bead core 1a toward the outer side in the tire radial direction RD. The other structures were set to the same as those of Comparative Example 1.

TABLE 1

| | Comparative Example 1 | Comparative Example 2 | Example 1 | Example 2 |
|---|---|---|---|---|
| Drawing | FIG. 4A | FIG. 4B | FIG. 2 | FIG. 1 |
| Embedded Position Of Ply End | Innermost | Outermost | Intermediate | Intermediate |
| Terminating Position (In Relation To Cross Sectional Height) | 5% | 5% | 5% | 15% |
| Bead Durability | 12,500 km | 12,500 km | 15,000 km | 15,000 km |
| Separation Property | X | X | ○ | ○ |

Table 1 showed that Example 1 was improved in both of the bead durability and the separation property in comparison with Comparative Examples 1 and 2. The same result as that of Example 1 was obtained in Example 2. Thus, the terminating position P of the second ply 4b is preferably arranged in the range between 5% and 15% of the tire cross sectional height H from the upper surface 1c of the bead core 1a toward the outer side in the tire radial direction RD.

TABLE 2

| | Comparative Example 3 | Example 3 |
|---|---|---|
| Drawing | — | FIG. 3 |
| Embedded Position Of Ply End | Innermost | Intermediate |
| Terminating Position (In Relation To Cross Sectional Height) | 30% | 30% |
| Bead Durability | 9,000 km | 11,000 km |
| Separation Property | X | ○ |

Table 2 showed that Example 3 was improved in both of the bead durability and the separation property in comparison with Comparative Example 3.

The description is given above of the embodiments according to the present invention with reference to the accompanying drawings, however, the specific structure should not be limited to these embodiments. The scope of the present invention is shown by claims as well as the description of the embodiments mentioned above, and includes all the changes within the equivalent meanings and scope of claims.

It is possible to apply the structure employed in each of the embodiments to the other optional embodiment. The particular structure of each of the portions is not limited to the embodiments mentioned above, but can be variously modified within a range which does not deviate from the scope of the present invention.

What is claimed is:

1. A pneumatic radial tire comprising:
   a pair of bead portions which have bead cores; and
   a carcass layer which is provided between the pair of bead portions and is locked in a state in which end portions are wound up to the bead cores,
   wherein the carcass layer is constituted by a first ply, a second ply and a third ply which are laminated one by one from an inner side to an outer side in a tire radial direction in a tire equator, wherein each of the first ply, the second ply and the third ply has a cord extending 90 degrees to a tire peripheral direction wherein the first ply and the third ply are wound up to the bead cores, and wherein the second ply terminates in a state in which the second ply is interposed between the first ply and the third ply, without reaching the bead cores.

2. The pneumatic radial tire according to claim 1, wherein the terminating position of the second ply is arranged in a range which is equal to or more than 0% and equal to or less than 30% of a tire cross sectional height from an upper surface of the bead core to an outer side in the tire radial direction.

3. The pneumatic radial tire according to claim 1, wherein the terminating position of the second ply is arranged in a range which is equal to or more than 5% and equal to or less than 15% of a tire cross sectional height from an upper surface of the bead core to an outer side in the tire radial direction.

4. A pneumatic radial tire comprising:

a pair of bead portions which have bead cores; and a carcass layer which is provided between the pair of bead portions and is locked in a state in which end portions are wound up to the bead cores, wherein the carcass layer is constituted by a first ply, a second ply and a third ply which are laminated one by one from an inner side to an outer side in a tire radial direction in a tire equator, wherein each of the first ply, the second ply and the third ply has a cord extending 90 degrees to a tire peripheral direction wherein the first ply and the third ply are wound up to the bead cores, wherein the second ply terminates in a state in which the second ply is interposed between the first ply and the third ply, without reaching the bead cores, and wherein the terminating position of the second ply is arranged in a range which is equal to or more than 0% and equal to or less than 30% of a tire cross sectional height from an upper surface of the bead core to an outer side in the tire radial direction.

5. A pneumatic radial tire comprising:

a pair of bead portions which have bead cores; and a carcass layer which is provided between the pair of bead portions and is locked in a state in which end portions are wound up to the bead cores, wherein the carcass layer is constituted by a first ply, a second ply and a third ply which are laminated one by one from an inner side to an outer side in a tire radial direction in a tire equator, wherein each of the first ply, the second ply and the third ply has a cord extending 90 degrees to a tire peripheral direction wherein the first ply and the third ply are wound up to the bead cores, wherein the second ply terminates in a state in which the second ply is interposed between the first ply and the third ply, without reaching the bead cores, and wherein the first ply and the third ply terminate at a position which is more outer side in a tire radial direction than an outer end in the tire radial direction of a bead filler.

* * * * *